(12) United States Patent
Mauer et al.

(10) Patent No.: US 8,254,930 B1
(45) Date of Patent: Aug. 28, 2012

(54) METHOD AND SYSTEM FOR CHANGING A MEDIA SESSION CODEC BEFORE HANDOFF IN A WIRELESS NETWORK

(75) Inventors: Brian D. Mauer, Shawnee, KS (US); Pedro Zamora, Kansas City, MO (US); John D. Lynch, Olathe, KS (US); Larry D. Cummings, Raytown, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 163 days.

(21) Appl. No.: 12/388,199

(22) Filed: Feb. 18, 2009

(51) Int. Cl.
*H04W 36/00* (2009.01)
(52) U.S. Cl. ...................................... 455/436
(58) Field of Classification Search .................... 455/436
See application file for complete search history.

(56) References Cited

U.S. PATENT DOCUMENTS

| | | |
|---|---|---|
| 5,649,299 A | 7/1997 | Battin et al. |
| 5,995,923 A | 11/1999 | Mermelstein et al. |
| 6,014,568 A | 1/2000 | Alperovich et al. |
| 6,021,328 A | 2/2000 | Curtis et al. |
| 6,148,207 A | 11/2000 | Baum |
| 6,172,974 B1 | 1/2001 | Tseng et al. |
| 6,243,590 B1 | 6/2001 | Reddy et al. |
| 6,272,358 B1 | 8/2001 | Brent et al. |
| 6,418,147 B1 | 7/2002 | Wiedeman |
| 6,480,541 B1 * | 11/2002 | Girod et al. ............... 375/240.12 |
| 6,501,736 B1 | 12/2002 | Smolik et al. |
| 6,591,110 B1 | 7/2003 | Kim et al. |
| 6,606,496 B1 | 8/2003 | Salvarani et al. |
| RE38,244 E | 9/2003 | Han et al. |
| 6,625,119 B1 * | 9/2003 | Schuster et al. ............... 370/230 |
| 6,718,183 B1 | 4/2004 | Blust et al. |
| 6,745,012 B1 | 6/2004 | Ton et al. |

(Continued)

FOREIGN PATENT DOCUMENTS

WO 2004/004249 1/2004

(Continued)

OTHER PUBLICATIONS

R. Ferrus et al., "Evaluation of a Cell Selection Framework for Radio Access Networks considering Backhaul Resource Limitations," The 18th Annual IEEE International Symposium on Personal, indoor and Mobile Radio Communications (PIMRC'07), Mar. 26, 2011.

(Continued)

*Primary Examiner* — Nick Corsaro
*Assistant Examiner* — Sowmini Nair

(57) ABSTRACT

Methods and systems for a wireless communication device (WCD) to change a media session codec prior to handoff to a new wireless coverage area are presented. In particular, a WCD is served by a first wireless coverage area of a RAN, and is conducting a media session using a first codec. The WCD detects that it is about to be handed off to a second wireless coverage area, and transmits a request to a server to determine the capacity available to the WCD via the second wireless coverage area. If this capacity is less than the capacity request by the first codec, the WCD proactively renegotiates the media session to use a second codec that requires less capacity. The server may take various factors into account when responding to the WCD's query, including the sector loading of the second wireless coverage area, available capacity at a backhaul link between the RAN and a network, and/or a profile of the WCD.

20 Claims, 6 Drawing Sheets

U.S. PATENT DOCUMENTS

| | | |
|---|---|---|
| 6,757,520 B2 | 6/2004 | Attar |
| 6,839,356 B2 | 1/2005 | Barany et al. |
| 6,856,954 B1 | 2/2005 | Su |
| 6,970,437 B2 | 11/2005 | Lott et al. |
| 6,975,609 B1 | 12/2005 | Khaleghi et al. |
| 6,980,523 B1 | 12/2005 | Lipford et al. |
| 7,058,124 B2 | 6/2006 | Koo |
| 7,099,283 B2 | 8/2006 | Matta et al. |
| 7,120,447 B1 | 10/2006 | Chheda et al. |
| 7,130,287 B2 | 10/2006 | Nounin et al. |
| 7,130,311 B2 | 10/2006 | Yavuz et al. |
| 7,139,274 B2 | 11/2006 | Attar |
| 7,142,562 B2 | 11/2006 | Yavuz et al. |
| 7,245,915 B2 | 7/2007 | Matta et al. |
| 7,328,027 B1 * | 2/2008 | Mangal ............... 455/453 |
| 7,394,789 B2 | 7/2008 | Sakawa et al. |
| 7,406,319 B2 | 7/2008 | Kostic et al. |
| 7,411,923 B2 | 8/2008 | Attar et al. |
| 7,411,974 B2 | 8/2008 | Attar et al. |
| 7,426,180 B2 | 9/2008 | Xu |
| 7,426,395 B2 | 9/2008 | Stephens |
| 7,440,431 B2 | 10/2008 | Sindhushayana et al. |
| 7,474,627 B2 | 1/2009 | Chheda et al. |
| 7,486,645 B2 | 2/2009 | Li et al. |
| 7,496,058 B2 | 2/2009 | Kim et al. |
| 7,602,722 B2 | 10/2009 | Chheda |
| 7,729,243 B2 | 6/2010 | Ananthaiyer et al. |
| 7,742,768 B2 | 6/2010 | Liu et al. |
| 7,746,816 B2 | 6/2010 | Attar et al. |
| 7,751,839 B2 | 7/2010 | Bowers et al. |
| 7,764,651 B2 | 7/2010 | Kwon |
| 7,822,064 B2 | 10/2010 | Thubert |
| 7,848,238 B1 | 12/2010 | Pawar |
| 7,852,759 B2 | 12/2010 | Stephenson |
| 7,894,488 B2 | 2/2011 | Shim |
| 7,921,348 B2 | 4/2011 | Seidel et al. |
| 7,953,048 B2 | 5/2011 | Yoon et al. |
| 8,014,280 B2 | 9/2011 | Zhang et al. |
| 8,040,803 B1 | 10/2011 | Pawar et al. |
| 8,094,623 B2 | 1/2012 | Attar et al. |
| 2002/0061749 A1 | 5/2002 | Hunzinger |
| 2002/0151310 A1 | 10/2002 | Chung et al. |
| 2002/0191693 A1 | 12/2002 | Nakagaki |
| 2003/0017831 A1 | 1/2003 | Lee et al. |
| 2003/0064741 A1 * | 4/2003 | Silva et al. ............... 455/522 |
| 2003/0072278 A1 | 4/2003 | Wu et al. |
| 2003/0095551 A1 | 5/2003 | Gotoh |
| 2003/0117956 A1 | 6/2003 | Lee |
| 2003/0129982 A1 | 7/2003 | Perini |
| 2003/0163558 A1 | 8/2003 | Cao et al. |
| 2003/0195006 A1 | 10/2003 | Choong et al. |
| 2004/0017860 A1 * | 1/2004 | Liu ........................ 375/299 |
| 2004/0057420 A1 * | 3/2004 | Curcio et al. ............ 370/352 |
| 2004/0071086 A1 | 4/2004 | Haumont et al. |
| 2004/0179525 A1 | 9/2004 | Balasubramanian et al. |
| 2004/0196852 A1 * | 10/2004 | Aksu et al. ............ 370/395.21 |
| 2004/0213182 A1 | 10/2004 | Huh et al. |
| 2004/0218533 A1 | 11/2004 | Kim et al. |
| 2005/0032522 A1 | 2/2005 | Soong et al. |
| 2005/0052996 A1 | 3/2005 | Houck et al. |
| 2005/0111397 A1 | 5/2005 | Attar et al. |
| 2005/0130663 A1 | 6/2005 | Hong et al. |
| 2005/0153695 A1 | 7/2005 | Cho |
| 2005/0159165 A1 | 7/2005 | Argyropoulos et al. |
| 2005/0201289 A1 | 9/2005 | Smolinske et al. |
| 2005/0250509 A1 | 11/2005 | Choksi |
| 2005/0286440 A1 | 12/2005 | Strutt et al. |
| 2006/0077994 A1 * | 4/2006 | Spindola et al. ............ 370/412 |
| 2006/0126509 A1 | 6/2006 | Abi-Nassif et al. |
| 2006/0159051 A1 | 7/2006 | English |
| 2006/0182062 A1 | 8/2006 | Sdralia et al. |
| 2006/0223585 A1 | 10/2006 | Legg |
| 2006/0250953 A1 | 11/2006 | Mooney et al. |
| 2006/0252429 A1 | 11/2006 | Chen et al. |
| 2006/0268764 A1 | 11/2006 | Harris |
| 2006/0291383 A1 | 12/2006 | Bi et al. |
| 2007/0060165 A1 | 3/2007 | Black et al. |
| 2007/0099648 A1 | 5/2007 | Kim et al. |
| 2007/0109967 A1 | 5/2007 | Ha |
| 2007/0127407 A1 | 6/2007 | Attar et al. |
| 2007/0127522 A1 | 6/2007 | Lundh et al. |
| 2007/0177510 A1 | 8/2007 | Natarajan et al. |
| 2007/0178906 A1 | 8/2007 | Gao et al. |
| 2007/0183427 A1 | 8/2007 | Nylander et al. |
| 2007/0197223 A1 | 8/2007 | Jung et al. |
| 2007/0201438 A1 | 8/2007 | Yoon et al. |
| 2007/0201439 A1 | 8/2007 | Sun et al. |
| 2007/0274257 A1 | 11/2007 | Bae et al. |
| 2008/0008093 A1 | 1/2008 | Wang |
| 2008/0049699 A1 | 2/2008 | Li et al. |
| 2008/0049706 A1 | 2/2008 | Khandekar et al. |
| 2008/0130495 A1 | 6/2008 | Dos Remedios et al. |
| 2008/0186862 A1 | 8/2008 | Corbett et al. |
| 2008/0188228 A1 | 8/2008 | Pecen et al. |
| 2008/0207170 A1 | 8/2008 | Khetawat et al. |
| 2008/0233967 A1 | 9/2008 | Montojo et al. |
| 2008/0247450 A1 | 10/2008 | Alexander |
| 2008/0280615 A1 | 11/2008 | Vinayakray-Jani |
| 2009/0059790 A1 | 3/2009 | Calvert et al. |
| 2009/0088157 A1 | 4/2009 | Aaron |
| 2009/0141683 A1 | 6/2009 | Grinshpun et al. |
| 2009/0170547 A1 | 7/2009 | Raghothaman et al. |
| 2009/0187690 A1 | 7/2009 | Smart et al. |
| 2009/0257361 A1 | 10/2009 | Deshpande et al. |
| 2009/0262720 A1 | 10/2009 | Kwon et al. |
| 2009/0285159 A1 | 11/2009 | Rezaiifar |
| 2010/0014487 A1 | 1/2010 | Attar et al. |
| 2010/0240373 A1 | 9/2010 | Ji et al. |
| 2010/0271962 A1 | 10/2010 | Han et al. |
| 2010/0296407 A1 | 11/2010 | Medvedev et al. |
| 2010/0309861 A1 | 12/2010 | Gorokhov et al. |
| 2011/0053596 A1 | 3/2011 | Wohlert et al. |
| 2011/0085607 A1 | 4/2011 | Dhandu et al. |
| 2012/0044908 A1 | 2/2012 | Spinelli et al. |

FOREIGN PATENT DOCUMENTS

| | | |
|---|---|---|
| WO | WO 20041028095 | 4/2004 |

OTHER PUBLICATIONS

Emilio Mino et al., "IST-4-027756 WINNER II, D4.8.3, Integration of cooperation on WINNER II System Concept," Information Society Technologies, Nov. 29, 2007.

Gregory Conklin et al., "Video Coding for Streaming media Delivery on the Internet," IEEE Transactions on Circuits and Systems for Video Technology, vol. 11, No. 3, Mar. 2001.

International Search Report and Written Opinion from International Application No. PCT/US2007/009296, dated Oct. 17, 2007.

U.S. Appl. No. 12/141,569, filed Jun. 18, 2008.
U.S. Appl. No. 12/350,694, filed Jan. 8, 2009.
U.S. Appl. No. 12/397,855, filed Mar. 4, 2009.
U.S. Appl. No. 12/432,736, filed Apr. 29, 2009.
U.S. Appl. No. 12/507,913, filed Jul. 23, 2009.
U.S. Appl. No. 12/494,999, filed Jun. 30, 2009.
U.S. Appl. No. 12/478,318, filed Jun. 4, 2009.
U.S. Appl. No. 12/538,624, filed Aug. 10, 2009.
U.S. Appl. No. 12/756,629, filed Apr. 8, 2010.
U.S. Appl. No. 12/731,895, filed Mar. 25, 2010.
U.S. Appl. No. 11/746,229, Pre-Interview Communication dated Dec. 30, 2009.
U.S. Appl. No. 11/746,229, First Action Interview Summary dated Jun. 2, 2010.
U.S. Appl. No. 11/746,229, Notice of Allowance dated Aug. 3, 2010.
U.S. Appl. No. 11/746,229, Interview Summary dated Apr. 6, 2010.
U.S. Appl. No. 12/141,569, Non-Final Office Action dated Mar. 22, 2011.
U.S. Appl. No. 12/350,694, Non-Final Office Action dated Jun. 22, 2010.
U.S. Appl. No. 12/350,694, Final Office Action dated Dec. 9, 2010.
U.S. Appl. No. 12/350,694, Non-Final Office Action dated Feb. 18, 2011.
U.S. Appl. No. 12/350,694, Notice of Allowance mailed Jun. 10, 2011.

U.S. Appl. No. 12/397,855, Non Final Office Action dated Oct. 12, 2010.
U.S. Appl. No. 12/397,855, Final Office Action dated Apr. 1, 2011.
U.S. Appl. No. 12/478,318, Non Final Office Action dated Dec. 8, 2010.
Liu, Xin et al., "Experiences in a 3G Network: Interplay between the Wireless Channel and Applications," MobiCom '08, Sep. 14-19, 2008.
Yeo, Woon-Young et al., "Traffic Management of High-Speed CDMA Systems Base on Loan Prediction," IEICE Electronics Express, 6(7):389-394 (published Apr. 10, 2009).
3rd Generation Partnership Project 2, "cdma2000 High Rate Packet Data Air Interface," 3GPP2 C.S0024-0, v. 4.0 (Oct. 2002).
3rd Generation Partnership Project 2, "cdma2000 High Rate Packet Data Air Interface," 3GPP2 C.S0024-A, v. 3.0 (Sep. 2006).
U.S. Appl. No. 12/538,624, Final Office Action dated Dec. 19, 2011.
U.S. Appl. No. 12/478,318, Non Final Office Action dated Oct. 27, 2011.
U.S. Appl. No. 12/141,569, Notice of Allowance dated Sep. 28, 2011.
U.S. Appl. No. 12/397,855, Non-Final Office Action dated Dec. 5, 2011.
U.S. Appl. No. 12/478,318, Notice of Allowance dated Jan. 30, 2012.
U.S. Appl. No. 12/731,895, Non Final Office Action dated Mar. 23, 2012.
U.S. Appl. No. 12/432,736, Non Final Office Action dated Mar. 27, 2012.
U.S. Appl. No. 12/756,629, Non Final Office Action dated Mar. 29, 2012.
U.S. Appl. No. 12/494,999, Notice of Allowance dated Mar. 30, 2012.

* cited by examiner

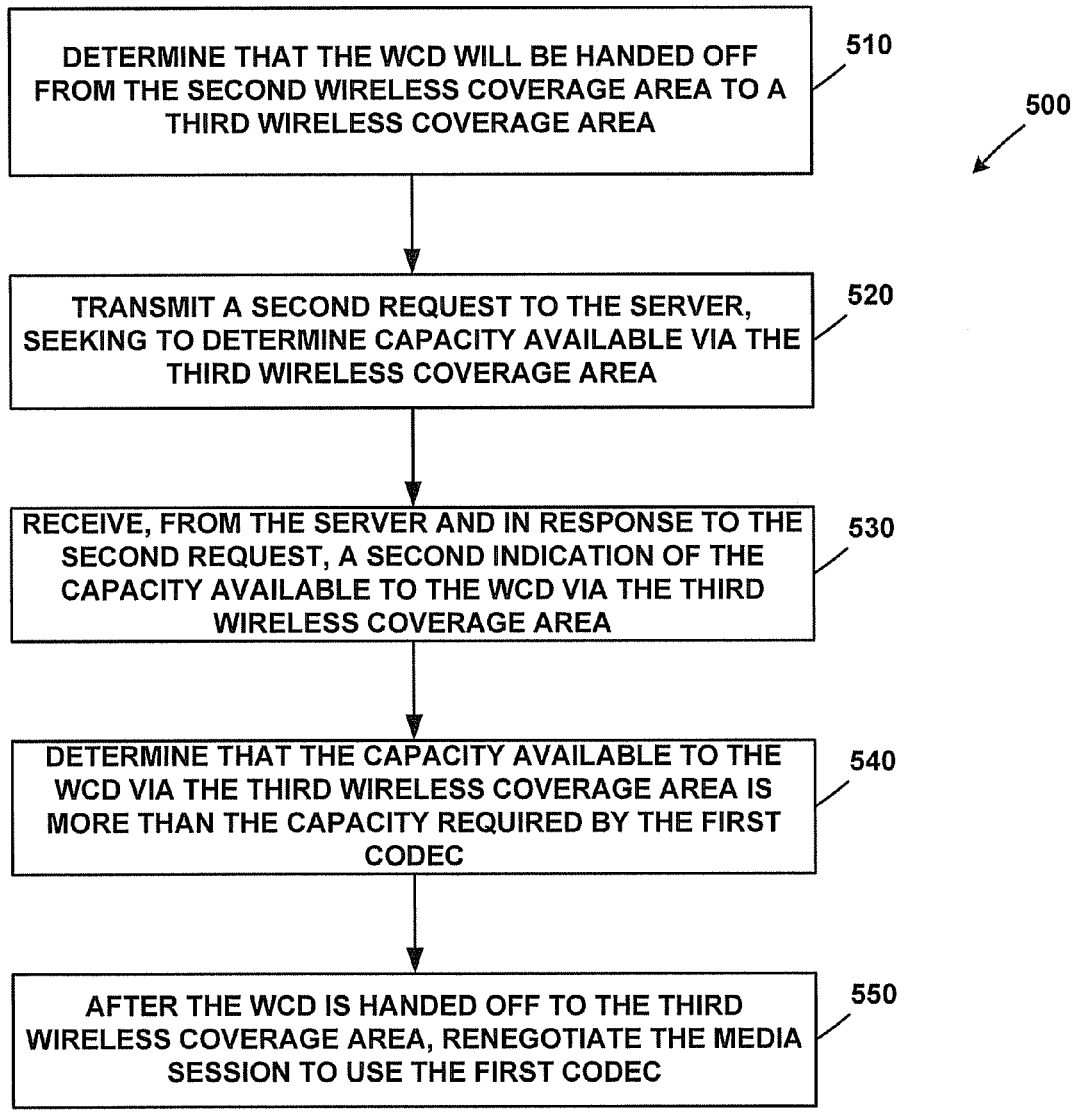

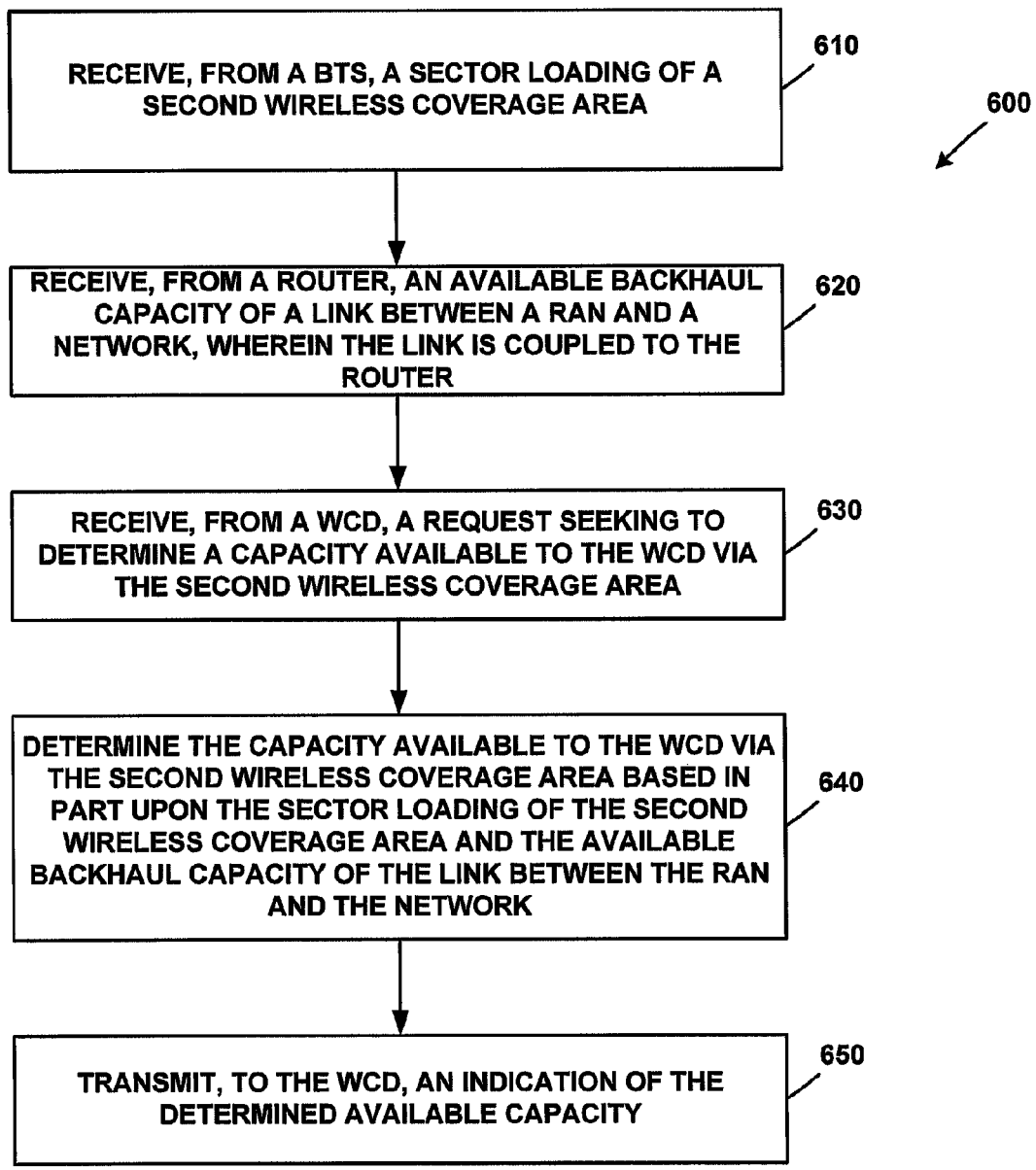

METHOD AND SYSTEM FOR CHANGING A MEDIA SESSION CODEC BEFORE HANDOFF IN A WIRELESS NETWORK

BACKGROUND

In a radio access network (RAN), a wireless communication device (WCD) is typically served by a wireless coverage area, and uses this wireless coverage area to communicate with other networked entities. Normally, a base transceiver station radiates to define one or more such wireless coverage areas. Thus, a RAN may support anywhere from one to dozens or more wireless coverage areas.

The WCD may move from location to location, and the radio characteristics of the air interface between the WCD and the base station may change. In response to these events, the WCD, the RAN, or both, may determine that the WCD would benefit from being assigned to a different wireless coverage area. The process in which the WCD switches from using one wireless coverage area to using another wireless coverage area is called a handoff.

Despite any efforts that the RAN may make to balance load between its wireless coverage areas, it is possible for the WCD to be handed off to a new wireless coverage area that has less capacity than the wireless coverage area to which WCD was previously assigned. This may have a deleterious impact on applications executing on the WCD, especially high bit rate, real time applications, such as interactive or streaming voice, audio, or video. Packets may be dropped, resulting in poor media quality and a frustrating user experience.

OVERVIEW

In order to accommodate the demand for wireless media applications while accounting for the limited capacity of wireless networks, new systems and methods for proactively changing media codecs prior to a handoff are presented.

When a WCD determines that it may be handed off to a new wireless coverage area while it is conducting an ongoing media session, the WCD may attempt to determine whether the capacity provided by the new wireless coverage is sufficient to support the capacity required by the media session. Accordingly, the embodiments herein may provide mechanisms through which the WCD can discover a representation of the new wireless coverage area's capacity. This representation may include measures of available capacity on one or more backhaul links connecting the new wireless coverage area to one or more networks. Since the actual capacity available to the WCD may depend upon both of these factors, it benefits the WCD, as well as other network entities, for the WCD to have an accurate view of the realizable capacity available via the new wireless coverage area and through the appropriate backhaul links.

However, it may also be beneficial to adjust this realizable capacity via the new wireless coverage area by policy considerations. Thus, for example, based on a priority associated with the WCD, a greater or lesser capacity may be reported to the WCD.

Accordingly, in a first embodiment, a WCD that is served by a first wireless coverage area conducts a media session with a remote host. The media session may be interactive or streaming media, such as video, audio, still images, voice, and so on. The WCD uses a first codec to encode and/or decode the media associated with the media session.

At some point in time, for instance upon determining that it is likely to be handed off to a second wireless coverage area, the WCD may transmit a request to a server. Preferably the request seeks to determine the capacity available to the WCD via the second wireless coverage area. This available capacity may be expressed in terms of a bitrate or may use some other metric. The WCD then receives, from the server, a response providing the requested available capacity.

The WCD subsequently determines that this available capacity is insufficient to support the ongoing media session. In response to this determination and prior to the handoff commencing, the WCD proactively renegotiates the parameters of the media session with the remote host to use a second codec. Preferably, the second codec's capacity requirements can be met by the capacity available to the WCD via second wireless coverage area.

A second embodiment is also directed to a system containing a RAN with a first wireless coverage area and a second wireless coverage area. Preferably, the RAN is coupled to a network (such as the Internet or a private network) via a router and a link. In this embodiment, a server receives sector loading information from the second wireless coverage. This sector loading information is indicative of capacity available to WCDs on the second wireless coverage area. The server may also receive, from a router connecting the RAN to a backhaul link, the available capacity of the backhaul link. Additionally, the server may receive, from a WCD being served by the first wireless coverage area, a request seeking to determine the available capacity via the second wireless coverage area. Based in part on the sector loading at the second wireless coverage area and the backhaul capacity of the link between the RAN and the network, the server determines an available capacity and transmits this determined available capacity to the WCD.

The server may have access to a profile that represents certain characteristics of the WCD, its user, or its applications. Accordingly, the server's determination of available capacity may also take into account some combination of information stored in the profile of the WCD. Of course, other information may be taken into account as well. Thus, the server may respond to the WCD's request with a representation of available capacity that is different from the actual capacity available to the WCD via the second wireless coverage area. In doing so, the operator of the RAN is afforded more options to flexibly manage the capacity of the RAN and any backhaul links between the RAN and other networks.

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

BRIEF DESCRIPTION OF THE DRAWINGS

FIGS. 4-6 depict methods in accordance with exemplary embodiments.

DESCRIPTION

In accordance with exemplary embodiments, systems and methods for proactively renegotiating a media codec for an ongoing media session are presented. Preferably, a WCD detects an upcoming handoff to a new wireless coverage area and requests, from a server, the capacity available to the WCD via the new wireless coverage area. The WCD receives a response from the server with this available capacity. Then, the WCD renegotiates a new media codec before the handoff occurs, where the capacity requirements of the new media codec are met by the available capacity as returned by the server. The server may take various factors into account when determining the available capacity of the second wireless coverage area.

I. SYSTEM ARCHITECTURE

Figure 1:
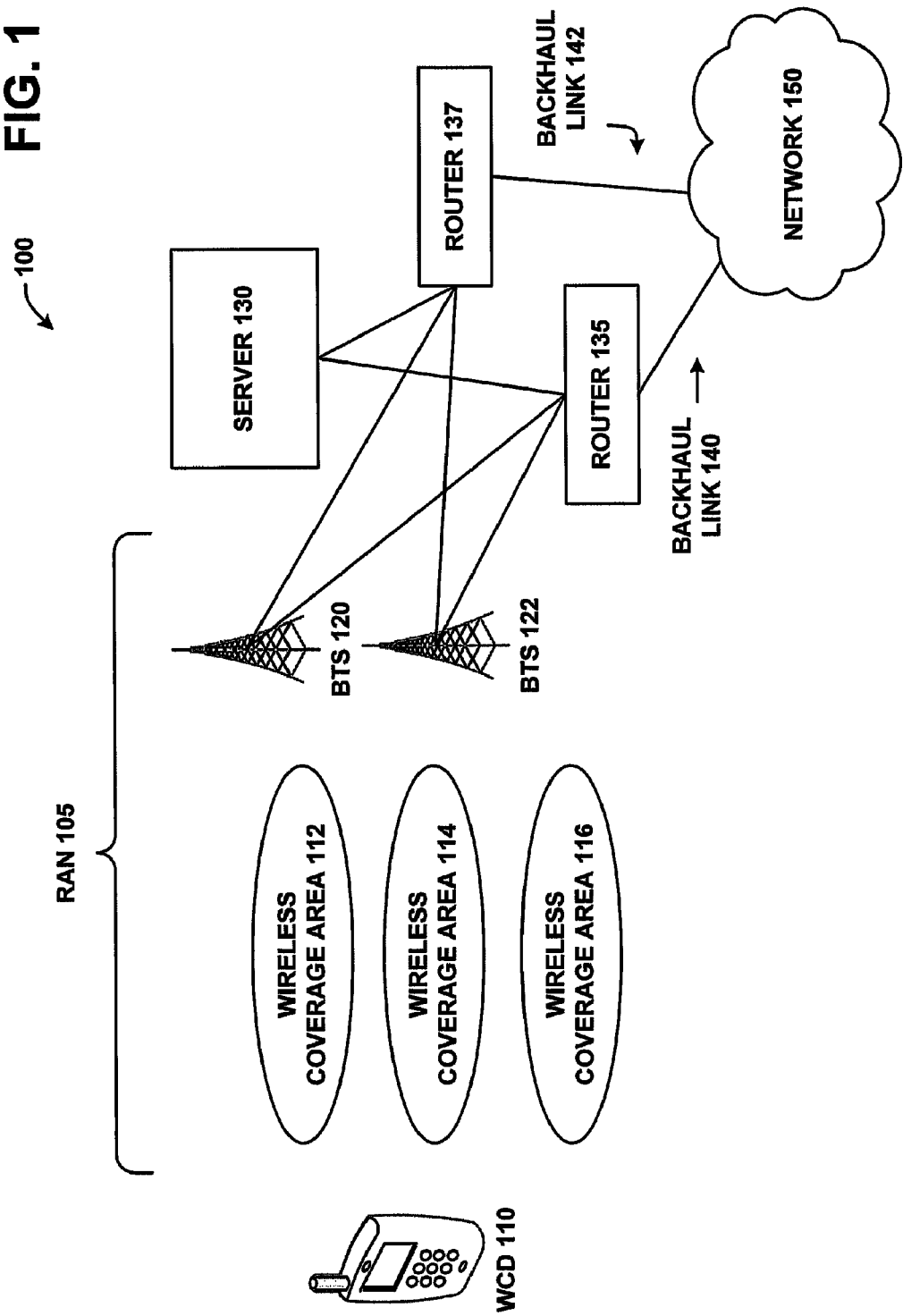
FIG. 1 depicts a network architecture in accordance with an exemplary embodiment.

FIG. 1 depicts an exemplary communication system 100. In communication system 100, a RAN 105 includes wireless coverage areas 112, 114, 116 and base transceiver stations (BTSs) 120, 122. One or both of these BTSs may radiate to define wireless coverage areas 112, 114, 116. For instance, BTS 120 may radiate to define a wireless coverage area 112, while BTS 122 radiates to define wireless coverage areas 114, 116.

For purposes of illustration, only two BTSs and three wireless coverage areas are shown. However, as few as one BTS radiating to define one wireless coverage area, or hundreds of BTSs radiating to define thousands of wireless coverage areas may be supported. Furthermore, each BTS may be communicatively coupled to one or more radio network controllers or base station controllers (not shown), that, among other things, manage the wireless resources associated with each BTS, and route traffic to and from each BTS. Alternatively, a radio network controller or base station controller may be integrated into or combined with BTS 120 and/or BTS 122. Regardless, BTSs 120, 122 may be communicatively coupled to network 150 via router 135 and backhaul link 140, or via router 137 and backhaul link 142.

It should be understood that backhaul links 140 and 142 may not be the only backhaul links connecting RAN 105 to other network entities. Also, other links, including some not shown, may be referred to as backhaul links. For instance, links between a BTS and a radio network controller may be considered backhaul links, and links between a radio network controller and a router may be considered backhaul links as well. Thus, the term "backhaul link" may refer to any of these links, or any other link, aside from an air interface link, that may be used by network communication involving WCD 110.

Wireless coverage areas 112, 114, 116 may provide air interface access to WCDs, such as WCD 110. The air interface of these wireless coverage areas may include forward links for transmitting information from a BTS to a WCD (in the forward direction) and reverse links for transmitting information from a WCD to a BTS (in the reverse direction). Through the forward and reverse links, a BTS and a WCD may exchange signaling traffic, as well as bearer traffic, such as voice, data, video, or other media.

A WCD in communication system 100, such as WCD 110, could be a wireless telephone, a wireless personal digital assistant, a wirelessly equipped laptop computer, a wireless router, or another type of mobile or fixed wireless device. Preferably, a WCD is a subscriber device that is manipulated by a human in order to establish circuit-switched or packet-switched voice and/or data calls. However a WCD could also be an automated device without a human interface.

Typically, a WCD is associated with one or more BTSs at a time and uses the wireless coverage areas of these BTSs to communicate with correspondent nodes, such as web servers, gaming servers, short message service (SMS) servers, voice over IP (VoIP) signaling proxies, VoIP bearer gateways, and other WCDs. A WCD may maintain a list of wireless coverage areas in its range as a candidate set or neighbor set. A WCD may also be able to transfer ongoing communication sessions from one BTS to another in a handoff process. Such a handoff process may be initiated or triggered by the WCD, the BTS, or a mutual agreement between the WCD and the BTS.

When a WCD enters a first wireless coverage area, some combination of the first wireless coverage area's serving BTS, radio network controller, base station controller, and the WCD itself, may determine that the first wireless coverage area should offer service to the WCD. If so, the WCD may register with the first wireless coverage area. Typically, this involves the WCD associating itself with the first wireless coverage area, and being assigned forward direction and reverse direction channels for signaling and/or bearer traffic. Once registered, a home location register (HLR), visitor location register (VLR), or both, maintain a record of the WCD's registration status, including an indication that the WCD is registered with the first wireless coverage area. Note that the HLR and the VLR are not shown in FIG. 1.

As the WCD continues to move, it may leave the first wireless coverage area and enter a second wireless coverage area. In this case, the WCD may be handed off from the first wireless coverage area to the second wireless coverage area. The WCD may then register with the second wireless coverage area, and the WCD's record in the HLR and/or VLR may be updated accordingly.

Server 130 may be a standalone component or may be integrated with other components, such as a radio network controller, base station controller, or BTS. Server 130 preferably maintains representations of at least some wireless coverage areas in RAN 105, at least some BTSs in RAN 105, backhaul link 140, backhaul link 142, and potentially other components as well. These representations preferably include an indication of the load on, or the load generated by, each of these components. These loads may be representations of bit rates, packet rates, processor utilization, memory utilization, link utilization, or some other measurement. Server 130 may also maintain representations of at least some WCDs served by RAN 105, including profiles associated with these WCDs.

For example, server 130 may contain a representation of the loads in each of wireless coverage area 112, 114, 116, as well as the loads on BTS 120, BTS 122, backhaul link 140, and backhaul link 142. Server 130 may be configured to periodically, upon request, or from time to time, receive representations of these loads from BTS 120, BTS 122, and/or routers 135 and 137, respectively. Furthermore, server 130 may contain a representation of the profiles of the various WCDs served by RAN 105, such as WCD 110.

Server 130 may be a computing device containing a processor and a memory, and supporting a general purpose operating system, such as MICROSOFT WINDOWS® or Linux. Alternatively, server 130 may be an embedded system, and may support a real-time operating system. Preferably, server 130 comprises one or more each of input devices, output devices, and network interfaces. For example, server 130 may support input via a keyboard, keypad, mouse, touchscreen, and so on. Server 130 may also support output via a screen, a monitor, a printer or some other device. Server 130 may include network interfaces, such as various types of wireline or wireless transceivers. Via these interfaces, server 130 may receive loading information from BTS 120, BTS 122, and routers 135 and 137. Furthermore, via these interfaces server 130 may receive a request from a WCD, such as WCD 110, seeking to determine an available capacity via one or more wireless coverage areas. Server 130 may respond to this request with an indication of such an available capacity, where the available capacity in the indication is based on the load on the wireless coverage area(s) and perhaps other factors.

Routers 135 and 137 may be off-the-shelf or custom routers, firewalls, or switches. Accordingly, these routers may be arranged to route packets between various components of communication system 100, such as BTS 120, BTS 122, server 130, backhaul link 140, and backhaul link 142. The routing may occur based information in the packets. This information in the packets may be associated with one or more layers of the open systems interconnection (OSI) protocol stack.

For example, routers 135 and 137 may route packets based on some combination of layer two, layer three, and layer four information. Thus, they may examine source and/or destination addresses of datalink, network, and transport protocol headers contained within packets in order to determine how to process these packets. Of course, routers 135 and 137 may also use additional information in the packets, and/or stored policy, in making this determination.

Routers 135 and 137 may also support the Internet Engineering Task Force (IETF) Simple Network Management Protocol (SNMP). SNMP is defined in IETF Requests For Comments (RFCs) 1901, 2576, 2578-2580, and 3410-3418, which are incorporated by reference in their entirety herein. Accordingly, routers 135 and 137 may support one or more Management Information Base (MIB) objects that provide access to data representing a load on backhaul links 140 and 142. This load may be in the form of bits per second of traffic, packets per second of traffic, a percentage of utilized capacity, or some other metric. Furthermore, the load may be represented as a smoothed average of measurements, such as an average percentage of utilized capacity calculated over a number of measurements taken over a period of time.

Regardless of its exact representation, this information is preferably available via SNMP. For instance, server 130 may query one or more MIB objects on router 135 and/or router 137, and in response router 135 and/or router 137 may transmit a representation of the load on backhaul links 140 and/or 142, respectively, to server 130. Alternatively, these routers may transmit the representation of the load to server 130 using an SNMP trap message. However, the routers need not support an SNMP interface to report the load on the backhaul links. Other protocols, standard or proprietary, may be used to accomplish the same purpose.

Backhaul links 140 and 142 may be wireline links, such as a type of Ethernet, SONET, or T-carrier. Alternatively, backhaul links 140 and 142 may be wireless links, such as a satellite, microwave, or similar point-to-point links. Preferably, backhaul links 140 and 142 connect RAN 105 to network 150, where network 150 is the Internet or a private IP network. But, in full generality, these backhaul links may connect any two or more component through which WCD 110 might communicate. Furthermore, these backhaul links may contain multiple physical or logical links or connections between RAN 105 and network 150.

It should be appreciated that the elements in FIG. 1 are exemplary, and in preferred embodiments of this invention more or fewer elements may be included in communication system 100, and the elements may be arranged differently or omitted altogether. For example, there may be multiple routers, each with multiple backhaul links, that communicate with server 130.

Furthermore, elements of communication system 100 may comprise multiple physical or logical devices or components, or may be combined into fewer physical or logical components than are shown in FIG. 1. Moreover, WCD 110, wireless coverage areas 112, 114, 116, and BTS 120, 122, may operate in accordance to various types of wireless protocols, such as Code Division Multiple Access (CDMA), Worldwide Interoperability for Microwave Access (WIMAX®), Universal Mobile Telecommunications System (UMTS®), Long Term Evolution (LTE®), IDEN®, 802.11 (Wifi), or other protocols now known or later developed.

II. EXAMPLE MESSAGE FLOWS

The embodiments herein involve media sessions between WCDs and remote hosts, for example, a media session between a WCD and a remote host. Preferably, the media session is logically decomposed into a control plane and a bearer plane. The control plane involves protocols that establish, manage and tear down the session, while the bearer plane involves the actual media (audio, video, and so on) that the media session transports.

One control plane protocol is the Session Initiation Protocol (SIP), which is defined in IETF RFC 3261 and incorporated by reference in its entirety herein. Another such control plane protocol is the Real Time Streaming Protocol (RTSP), which is defined in IETF RFC 2326 and also incorporated by reference in its entirety herein. Yet another control plane protocol is H.323, which is defined in the International Telecommunications Union (ITU) Recommendation H.323, and is also incorporated by reference in its entirety herein.

Control plane protocol or protocols preferably allow negotiation of one more bearer plane media codecs between the WCD and remote host. Example voice codecs include G.711, G.723.1, and G.729, defined in ITU Recommendations G.711, G.723.1, and G.729, respectively, all of which are incorporated by reference in their entirety herein. Example audio codecs include the Moving Picture Experts Group (MPEG) Layer 3 (MP3), and example video codecs include MPEG Layer 4 (MPEG-4). However, the embodiments described herein are not limited to just these codecs.

Each type of codec may support multiple bit rates. For instance, the MPEG-4 codec may support bit rates of 768, 384, and 192 kilobits per second. The same video media can be encoded using these different bit rates by adjusting the parameters of the encoding. These parameters may include sampling rate, resolution, and color depth, just to name a few. Audio codecs may vary their sampling rate and supported frequency range, for example, to produce different bit rates. Thus, even though a designation, such as MP3 or MPEG-4, may be referred to as a "codec," such a designation may actually refer to a family of different codecs.

In general, the higher the bit rate of a codec, the higher the quality of the media produced by the codec. Thus, it is usually advantageous to the WCD and the remote host to engage in a media session using the highest bit rate codec that the network(s) and link(s) between them can support. But, network and link conditions may fluctuate over time. Thus, the WCD and the remote host may adapt to these conditions by switching to a lower or higher bit rate codec while in an ongoing media session. Accordingly, the control plane protocol or protocols also preferably allow mid-session re-negotiation of such a codec.

SIP, for example, uses an INVITE message to initiate a session between two or more devices, as well as to renegotiate session parameters after the session has been established. The INVITE message may specify information related to the identification of the devices, authentication information, and session options. One type of session option may be a media codec. However, an INVITE message may also specify other types of information and other session options.

Using SIP, the WCD may transmit an INVITE message to the remote host in order to establish a media session with the remote host using the first codec. Later, after bearer traffic using the first codec is passing between the WCD and the remote host, the WCD may determine that it should use a lower bit rate codec. This determination may be made according to the methods described below. Accordingly, the WCD may transmit another SIP INVITE message to the remote host. This second INVITE message preferably specifies a different codec than the codec that was specified in the initial INVITE message, or the INVITE message may specify the same codec that was specified in the initial INVITE message, but instruct he remote host to use different parameters. The act of transmitting a mid-session SIP INVITE message is sometimes referred to as transmitting a re-INVITE message. Presumably, the remote host supports the codec specified in the second INVITE and the codec used in the media session is changed accordingly.

The step of renegotiating the media session's codec may involve more communication than just the WCD transmitting a SIP INVITE. In response to the SIP INVITE, the remote host may transmit a SIP 200 OK message to the WCD, and the WCD may then transmit a SIP ACK message to the remote host. Of course, the WCD and the remote host may transmit other SIP messages as well during this step.

Figure 2:
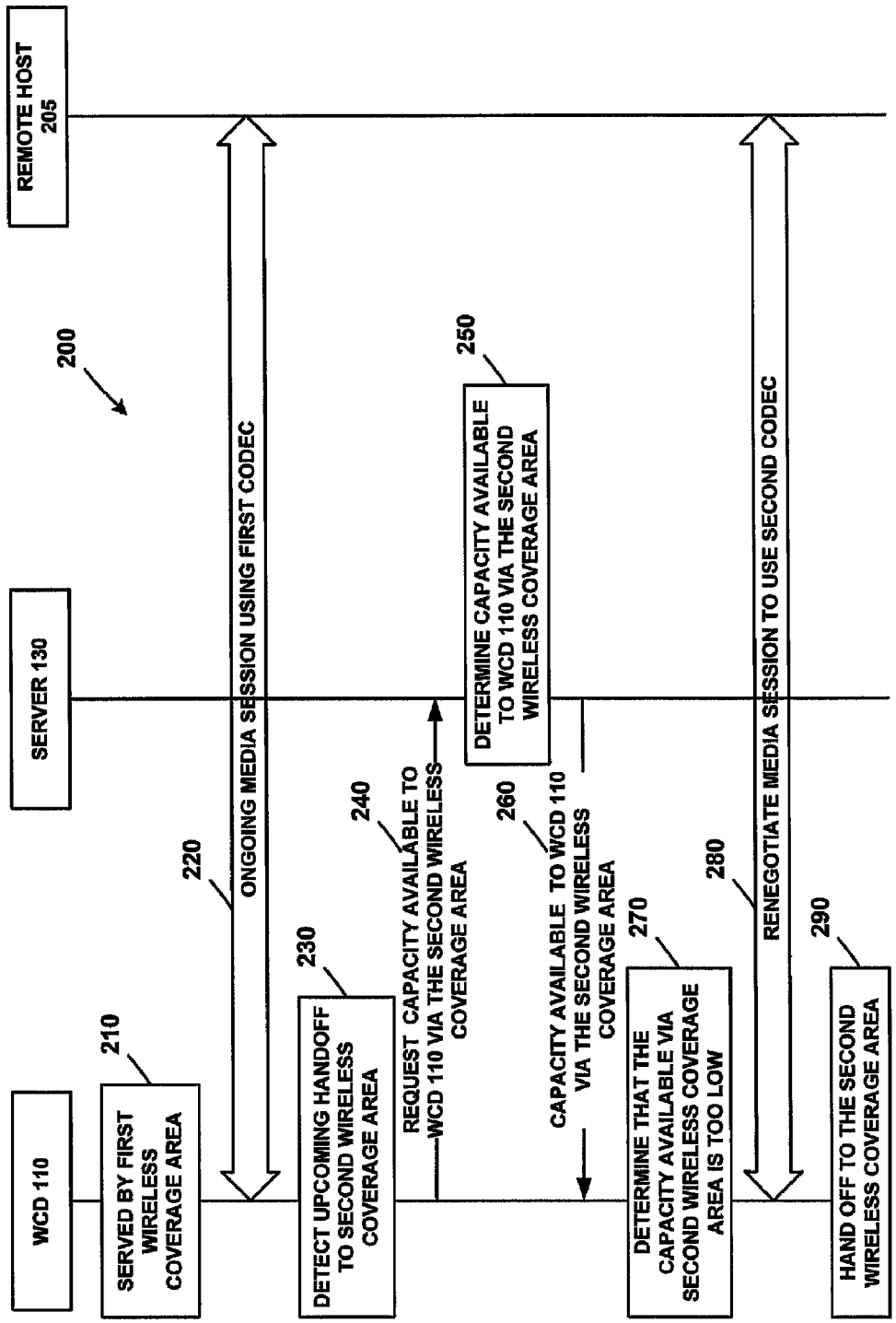
FIG. 2 depicts a message sequence in accordance with an exemplary embodiment.

FIG. 2 is directed to a WCD proactively renegotiating a media codec in response to the WCD determining that it is about to be handed off to a wireless coverage area that may not have capacity to support the bit rate required by the codec that the WCD is currently using. In FIG. 2, message flow 200 includes WCD 110, server 130, and remote host 205. Preferably, WCD 110 is engaged in a media session with remote host 205. This media session may be an interactive or non-interactive voice, audio, or video session, or may contain some combination of voice, audio, or video communication.

At step 210 of message flow 200, WCD 110 is served by a first wireless coverage area. At step 220, WCD 110 conducts an ongoing media session with remote host 205. Preferably, the media session uses a first codec on its bearer plane and uses SIP on its control plane. At step 230, WCD 110 detects an upcoming handoff to a second wireless coverage area.

There are a number of ways that WCD 110 can detect an upcoming handoff. Typically, a WCD will receive pilot signals of more than one wireless coverage area. Among other information, these pilot signals provide the WCD with an indication of the signal strength of each wireless coverage area. If the WCD or the RAN determines that (1) the signal strength of the first wireless coverage area, as received and measured by the WCD, is too low, and (2) the signal strength of the second wireless coverage area, as received and measured by the WCD, is sufficient for the WCD to be effectively served, then the WCD may determine that it is likely to be handed off to the second wireless coverage area.

Note that even if WCD 110 detects an upcoming handoff to a new wireless coverage area, this handoff may or may not be imminent. For instance, the WCD may be leaving the range of the first wireless coverage area and entering the range of the second wireless coverage area. In such a case, the handoff to the second wireless coverage area may be imminent. On the other hand, the WCD may be on the border of the first and second wireless coverage areas. The WCD may detect an upcoming handoff from the first wireless coverage area to the second wireless coverage area, but then the WCD may move away from the border and into the center of the first wireless coverage area. In such a case, the WCD would probably not be handed off to the second wireless coverage area, even though the WCD detected an upcoming handoff.

WCD 110 may also maintain a pre-handoff threshold value. In this case, when WCD 110 determines that a quality of the coverage that it is receiving from the first wireless coverage area is below the pre-handoff threshold value, then WCD 110 may presume that a handoff is likely. Such qualities of coverage could include, but are not limited to, a wireless coverage area's pilot signal strength as received by WCD 110, or the bit error rate or frame error rate of information as received by WCD 110.

At step 240, WCD 110 transmits a request to server 130. The request is preferably generated by a dedicated application executing on WCD 110. This application may use IP to carry the request to server 130. However, the request may be generated by an application that also performs other tasks on WCD 110, or may be generated by the operating system of WCD 110.

Regardless, the request may query server 130 for a capacity that is available to WCD 110 via the second wireless coverage area. In doing so, WCD 110 seeks to determine if the second wireless coverage area, to which WCD 110 will likely be handed off, has enough capacity to support the media session using the first codec. The request may query server 130 for capacities available to WCD 110 from other wireless coverage areas as well. For example, WCD 110 may ask server 130 for capacities available to it via all of the wireless coverage areas in the candidate set or neighbor set of WCD 110. Doing so allows WCD 110 to determine these respective capacities with a single message rather than with multiple messages.

Furthermore, in a RAN where there are multiple candidate wireless coverage areas to which WCD 110 could be handed off, WCD 110 might not be certain to which candidate wireless coverage area it may ultimately be handed off. Thus, knowing the capacity available via all such candidate wireless coverage areas allows WCD 110, for example, to renegotiate its media codec to adapt to the lowest capacity available across all of these candidates.

Step 240 may occur, as depicted in FIG. 2, after WCD 110 detects an upcoming handoff to the second wireless coverage area. In fact, step 240 may occur in response to this detecting. However, step 240 could also occur at a different point in message flow 200. For instance, step 240 may occur based on a change in membership to the candidate set or neighbor set of WCD 110, may occur periodically, or may occur in response to other events.

Regardless of when and why step 240 occurs, at step 250, server 130 determines the capacity available to WCD 110 via the second wireless coverage area. This capacity may be reported as a bit rate, as a packet rate, as a percentage of utilized or available capacity, or as some other metric. Such a metric may represent available capacity or may be information from which WCD 110 can derive a measurement or estimate of available capacity. At step 260, server 130 transmits an indication of this available capacity to WCD 110.

At step 270, WCD 110 determines that this available capacity is insufficient to support the ongoing media session using the first codec. Accordingly, at step 280, WCD 110 initiates a re-negotiation of the media session. Preferably, WCD 110 transmits a SIP INVITE to remote host 205. This SIP INVITE contains at least an indication that WCD 110 is seeking to use a second codec for the ongoing media session. In particular, this second codec may require less capacity than the first codec. For example, suppose that the media session is an MPEG-4 streaming video session and the first codec (and MPEG-4 codec) requires 768 kilobits per second. If, at step 270, WCD 110 determines that the available capacity is only 512 kilobits per second, then WCD 110 may seek to renegotiate the MPEG-4 streaming video session to use a second codec (another MPEG-4 codec) that requires only 384 kilobits per second. Of course, a WCD may renegotiate a media session to use a codec from a different codec family (e.g., going from using an MPEG-4 codec to a non-MPEG-4 codec or vice versa).

At step 290, this renegotiation is complete, and WCD 110 may be handed off to the second wireless coverage area. By proactively renegotiating the codec used by the media session prior to the handoff, WCD 110 avoids using a codec with a bit rate that cannot be supported by the second wireless coverage area. Thus, the media session is less likely to experience dropped packets and impaired quality due to network congestion. While using a lower bit rate codec at WCD 110 may reduce the quality of the media session as experienced by a user of WCD 110 to some extent, doing so limits the negative impact that the media session will have on the user of WCD 110 and other users. For instance, assume that WCD 110 is sharing the second wireless coverage with ten other WCDs and attempts to utilize more capacity than is available. Not only may WCD 110 experience packet loss and a degraded quality for its media session, it may also cause network congestion in the second wireless coverage area, at the BTS that defines the second wireless coverage area, or further downstream. This congestion could result in reducing the effective data rates of at least some of the other ten WCDs.

Once WCD 110 has been served by the second wireless coverage area for some time, WCD 110 may determine that it is about to be handed off again. This second handoff may be to a third wireless coverage area or back to the first wireless coverage area. For sake of discussion, assume that WCD 110 determines that it is about to be handed off to a third wireless coverage area. This third wireless coverage area may either be the first wireless coverage area or a different wireless coverage area. In response to the determination, WCD 110 may transmit a second request to server 130, seeking to determine the capacity available to it via the third wireless coverage area. Subsequently, WCD 110 may receive, from server 130, an indication of the requested available capacity. Alternatively, this request and response may occur before WCD 110 determines that it is about to be handed off, and/or in response to some other event.

Regardless, WCD 110 may determine that the capacity available to it via the third wireless coverage area is at least as much as the capacity required by the first codec. For instance, if the first codec requires 768 kilobits per second and WCD 110 may determine that the capacity available exceeds this rate. Accordingly, WCD 110 may, after being handed off to the third wireless coverage area, renegotiate the media session to use the first codec. In this way, WCD 110 reverts to using a higher bit rate codec when network conditions are amenable to the use of the higher bit rate codec.

Alternatively, WCD 110 may renegotiate the media session to use a third codec that requires a different bit rate than the first codec. For instance, WCD 110 may determine that the capacity available to it via the third wireless coverage area is such that WCD 110 should use a third codec with a bit rate between that of the first code and the second codec. On the other hand, WCD 110 may determine that the available capacity allows WCD 110 to use a third codec with a bit rate greater than that of the first codec.

Figure 3:
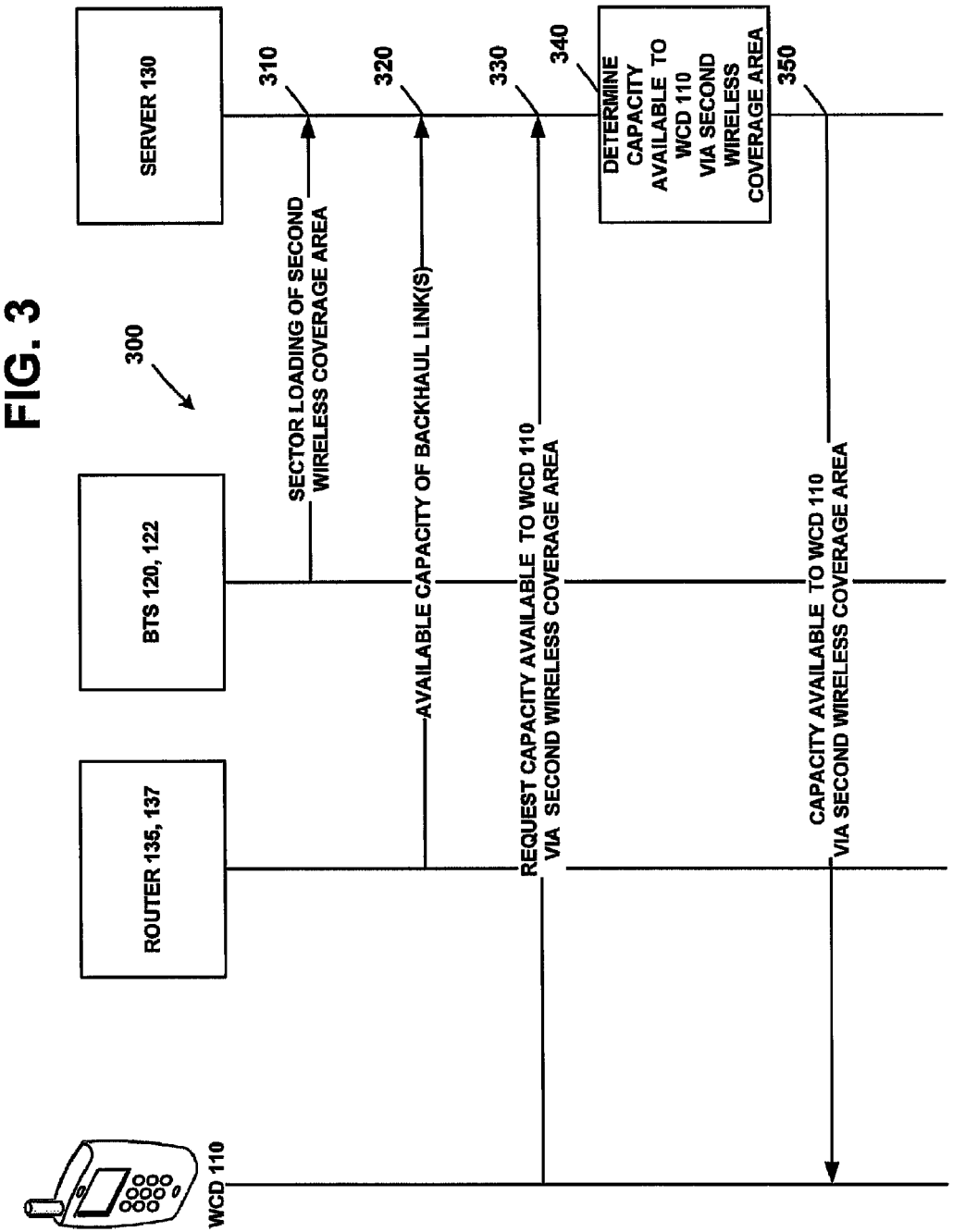
FIG. 3 depicts another message sequence in accordance with an exemplary embodiment.

FIG. 3 is directed to a server receiving information from various network components representing available capacities at the components, and using this information to determine a capacity available to a WCD via a wireless coverage area. The message flow in FIG. 3 illustrates how a server, such as server 130, may determine a capacity available to a WCD via a wireless coverage area.

At step 310, server 130 receives sector loading information from BTS 120, BTS 122, or both. Preferably, this sector loading information includes a representation of the sector loading at the second wireless coverage area. The sector loading of a wireless coverage area can be represented in various ways. It may take the form of a number of communication sessions currently supported at the wireless coverage area, or an aggregate data rate of all such communication sessions. Furthermore, such a number of communication sessions or data rate may be represented as an absolute value, such as a count of the communication sessions or the total bits per second used by the communication sessions. Or, the number of communication sessions or data rate may be represented as a relative percentage of used capacity. (For instance, if the wireless coverage area can support at most 30 communication sessions and currently supports 15 communication sessions, a BTS could report the sector loading of the wireless coverage area as 50%.)

Alternatively or additionally, a representation of sector loading may be based on measurements performed by one or more WCDs served by the wireless coverage area. For instance, each WCD served by a wireless coverage area may report a bit error rate or frame error rate that it has observed when communicating via the wireless coverage area. The WCDs may report this information to the BTS that radiates to define the wireless coverage area, and then the BTS may subsequently provide this information to server 130.

At step 320, server 130 receives a representation of available capacity of backhaul link 140. This representation may also take the form of an absolute or a relative measurement. For example, the measurement could take the form of a number of available bits per second or a percentage of available capacity on backhaul link 140 and/or backhaul link 142.

The messages received by server 130 in steps 310 and 320 may be received by server 130 periodically or aperiodically. Alternatively or additionally, server 130, or some other entity, may request the sector loading of a wireless coverage area from a BTS and/or request an available capacity of backhaul link 140 and/or backhaul link 142.

By considering the available capacity of a backhaul link along with the sector loading of a wireless coverage area, a more accurate representation of the actual capacity available to a WCD served by the wireless coverage area may be formed. In some high speed wireless networks, there may be more capacity available to the WCD in the wireless coverage area than on the backhaul link. This may be the case because a large number of WCDs from multiple wireless coverage areas may share the backhaul link. Thus, if server 130 only considered the capacity available via the wireless coverage area, it might overestimate the actual end-to-end network capacity available to a WCD. However, server 130 considering only the available capacity of a wireless coverage area is within the scope of the embodiments herein.

At step 330, server 130 receives a request from WCD 110 for the capacity available to it via the second wireless coverage area. Presumably, WCD 110 is currently served by a first wireless coverage area, is conducting a media session with a remote host, and has determined that it will likely be handed off to the second wireless coverage area. Thus, WCD 110 may be requesting the capacity available to it via the second wireless coverage area in order to determine whether this available capacity is sufficient for its ongoing media session.

At step 340, server 130 determines such an available capacity. To do so, server 130 may consider any information on hand, including the information it may have received in steps 310 and 320. Furthermore, server 130 may also take an identity of WCD 110 into account when making this determination.

For instance, server 130 may store, or have access to, a profile for WCD 110. Among other things, this profile may contain the identity of WCD 110 and/or its current user, and various parameters that represent the relative priority of WCD 110, its current user, and/or its current communication session(s). This priority may be a simple relative ranking (e.g., "high," "medium," or "low") or a more complex representation. As an example, the representation of priority may conform to the IETF differentiated services codepoint specification described in IETF RFC 2475, which is incorporated in its entirety herein.

Regardless of the exact representation of the priority in the profile, server 130 may compare the priority to a threshold value, and adjust the value of available capacity that it reports to WCD 110 based on the outcome of this comparison. Thus, if a profile indicates that WCD 110, its current user, or its current session has a high priority (i.e., above the threshold value), server 130 may report the available capacity to be a higher value. On the other hand, if the profile indicates that WCD 110, its current user, or its current session has a low priority (i.e., below the threshold value), server 130 may report the available capacity to be a lower value. Thus, server 130 may report an available capacity to WCD 110 that may be different from the actual unused capacity present on a path including a wireless coverage area and a backhaul link.

Consequently, the determination made at step 340 may include consideration of the capacity available to WCD 110 via the second wireless coverage area, the available capacity on backhaul link 140 and/or backhaul link 142, and a profile of WCD 110. For instance, assume that the second wireless coverage area has 2 megabits per second of available capacity, and is only connected to one backhaul link. Assume further that this backhaul link has 3 megabits per second of available capacity, and the profile of WCD 110 indicates a high priority. Then, server 130 may determine that the capacity available to WCD 110 via the second wireless coverage area is 2 megabits per second. In doing so, server 130 may calculate the minimum of the wireless coverage area capacity and the backhaul link capacity to determine the available capacity. Server 130 then may decide that it should provide the entire 2 megabits per second as available capacity to WCD 110, since the profile of WCD 110 indicates that WCD 110 has a high priority. Accordingly, server 130 may report that the maximum achievable end-to-end bit rate for WCD 110 is 2 megabits per second.

On the other hand, if the second wireless coverage area has 2 megabits per second of available capacity, backhaul link 140 has 3 megabits per second of available capacity, and the profile of WCD 110 indicates a low priority, then server 130 may determine that the capacity available to WCD 110 via the second wireless coverage area is 1 megabit per second. In doing so, server 130 may calculate the minimum of the wireless coverage area capacity and the backhaul link capacity to determine an available capacity of 2 megabits per second. Server 130 then may decide that it should report a lower available capacity to WCD 110, since the profile of WCD 110 indicates that WCD 110 has a low priority. Of course, these two determinations of available capacity are merely illustrative, and server 130 could make many other determinations of available capacity in accordance with the embodiments herein.

At step 350, server 130 transmits the determined available capacity to WCD 110. In this transmission, server 130 could encode the determined available capacity in various formats, such as a bit rate, a relative bit rate, an index or reference number representing a bit rate, or some other format. Thus, server 130 informs WCD 110 of the maximum capacity that it should attempt to use while served by the second wireless coverage area.

III. EXAMPLE FLOW CHARTS

Figure 4:
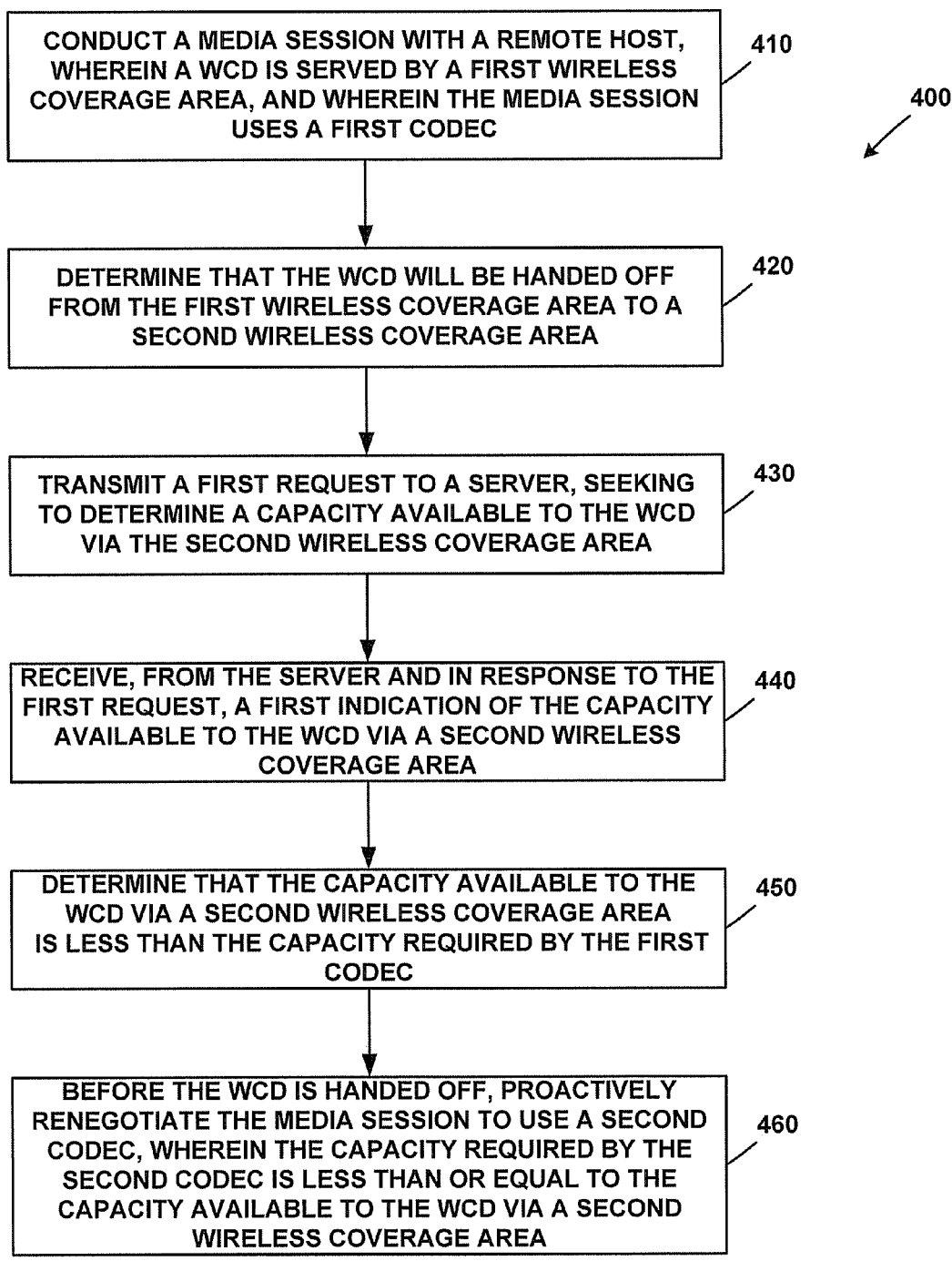

FIGS. 4-6 are flow charts illustrating methods in accordance with preferred embodiments. FIGS. 4 and 5 depict methods that could be performed by a WCD, such as WCD 110. FIG. 6 depicts a method that could be performed by a server, such as server 130. It should be understood that for each method depicted in FIGS. 4-6, more or fewer steps may be used, and the steps may occur in a different order. Furthermore, the methods depicted in these figures may be combined, in whole or in part, and still be within the scope of the preferred embodiments.

FIG. 4 depicts method 400 for proactively renegotiating a media session to use a lower bit rate codec prior to handoff to a new wireless coverage area. At step 410, a WCD is conducting a media session with a remote host. The WCD is served by a first wireless coverage area, and the media session uses a first codec. The media session may support audio, video, multimedia or some combination of thereof. At step 420, it is determined that the WCD will be handed off from the first wireless coverage area to a second wireless coverage area. Accordingly, at step 430, the WCD transmits a first request to a server, seeking to determine a capacity available to the WCD via the second wireless coverage area. In response to the first request, the WCD receives, in step 440, a first indication of the capacity available to it via the second wireless coverage area.

At step 450, the WCD determines that this available capacity is less than the capacity required by the first codec. Thus, at step 460, before the WCD is handed off, the WCD proactively renegotiates the media session to use a second codec. This renegotiation may be triggered by the WCD transmitting a SIP INVITE message to the remote host, where the SIP INVITE indicates that the second codec is to be used for the media session. Preferably, the capacity required by the second codec is less than or equal to capacity available to the WCD via the second wireless coverage area.

FIG. 5 depicts a method 500 that continues from where method 400 left off. At step 510, the WCD detects an upcoming handoff from the second wireless coverage area to a third wireless coverage area. As a result, at step 520, the WCD transmits a second request to the server, seeking to determine the capacity available to the WCD via the third wireless coverage area. At step 530, the WCD receives, from the server, a response containing a second indication of capacity available to the WCD via the third wireless coverage area.

At step 540, the WCD determines that this available capacity is more than the capacity required by the first codec. Thus, the WCD can once again use the first codec once the WCD is handed off to the third wireless coverage area. It may be advantageous for the WCD to switch from using the second codec to using the first codec because the first codec may provide for a higher quality media session. Accordingly, at step 550, after the WCD is handed off to the third wireless coverage area, the WCD renegotiates the media session to use the first codec. This renegotiation may be triggered by the WCD transmitting a SIP INVITE message to the remote host, where the SIP INVITE indicates that the first codec is to be used for the media session.

FIG. 6 depicts method 600 for a server to determine a capacity available to a WCD via a wireless coverage area. At step 610, the server receives, from a BTS, a sector loading of a second wireless coverage area. Preferably, the BTS radiates to define the second wireless coverage area, and the sector loading is represented by an absolute or relative measure of the unused capacity of the second wireless coverage area. The BTS may be an element of a RAN, the RAN containing one or more such BTSs, as well as other elements. At step 620, the server receives, from a router, an available capacity of a backhaul link between the RAN and a network. Preferably, the available capacity on the backhaul link is represented by an absolute or relative unused capacity of the backhaul link. Steps 610 and 620 may occur periodically or may be triggered by some event, such as a request from the server. Furthermore, if the RAN comprises multiple BTSs and/or routers, the server may receive available capacities from each of these BTSs and/or routers.

At step 630, the server receives, from a WCD, a request seeking to determine a capacity available to the WCD via the second wireless coverage area. At step 640, the server determines this available capacity. In doing so, the server may take into account information received from the BTS that defines the second wireless coverage area, as well as any routers connecting the BTS to backhaul links. Furthermore, the server may also take into account information related to the identity of the WCD, its current user, and/or its current communication sessions. At step 650, the server transmits the determined available capacity to the WCD.

In this way, the server is able to effectively manage the resources and capacity of the wireless coverage areas and the backhaul links. As a result, an operator of the RAN is able to allocate capacity to WCDs based on the relative priority of those WCDs, their users, or their applications. Doing so potentially improves the user experience of all users accessing the RAN and therefore increases these users' satisfaction with the operator's service.

IV. CONCLUSION

Exemplary embodiments have been described above. Those skilled in the art will understand, however, that changes and modifications may be made to these embodiments without departing from the true scope and spirit of the invention, which is defined by the claims.

What is claimed is:

1. A wireless communication system comprising:
   at least one base transceiver station (BTS) radiating to define a first wireless coverage area and a second wireless coverage area;
   a router (1) coupled to the at least one BTS, and (2) coupled to a backhaul connection between the wireless communication system and a network;
   a server, arranged to determine an available capacity via a second wireless coverage area, and wherein the determination of the available capacity is based in part on (1) a sector loading of the second wireless coverage area, and (2) an available backhaul capacity of the backhaul connection as received from the router; and
   a wireless communication device (WCD), served by the first wireless coverage area, and configured to (1) conduct a media session with a remote host, wherein the media session uses a first codec, and wherein the media session is conducted via the network, (2) transmit a request to the server, seeking to determine the available capacity via the second wireless coverage area, (3) receive, from the server and in response to the request, an indication of the available capacity via the second wireless coverage area, (4) determine that the WCD will be handed off from the first wireless coverage area to the second wireless coverage area, (5) determine that, based on a comparison between the available capacity via the second wireless coverage area and a capacity pre-defined for the first codec, that the available capacity via the second wireless coverage area is less than the capacity pre-defined for the first codec, and (6) in response to determining that the available capacity via the second wireless coverage area is less than the capacity pre-defined for the first codec, proactively renegotiate the media session to use a second codec, wherein a capacity pre-defined for the second codec is less than or equal to the available capacity via the second wireless coverage area, and wherein the proactive renegotiation occurs before the WCD is handed off.

2. The system of claim 1, wherein the media session uses a Session Initiation Protocol (SIP) for signaling and wherein proactively renegotiating the media session to use the second codec involves the WCD transmitting a mid-session SIP INVITE message to the remote host.

3. The system of claim 1, wherein the available capacity via the second wireless coverage area is determined also based on a profile of the WCD.

4. The system of claim 1, wherein the sector loading of the second wireless coverage area is determined by a number of data sessions at the second wireless coverage area.

5. The system of claim 1, wherein the sector loading of the second wireless coverage area is determined by an aggregate data rate at the second wireless coverage area.

6. A method, performed by a wireless communication device (WCD), wherein the WCD is communicatively coupled to a radio access network (RAN), the RAN comprising a plurality of wireless coverage areas and a server, wherein the plurality of wireless coverage areas includes a first wireless coverage area and a second wireless coverage area, the method comprising:
   conducting a media session with a remote host, wherein the WCD is served by the first wireless coverage area, and wherein the media session uses a first codec;
   determining that the WCD will be handed off from the first wireless coverage area to the second wireless coverage area;
   transmitting a first request to the server, seeking to determine an available capacity via the second wireless coverage area;
   receiving, from the server and in response to the first request, a first indication of the available capacity via the second wireless coverage area;
   based on a comparison of the available capacity via the second wireless coverage area and a capacity pre-defined for the first codec to determining that the available capacity via the second wireless coverage area is less than the capacity pre-defined for the first codec; and
   based on determining that the available capacity via the second wireless coverage area is less than the capacity pre-defined for the first codec, proactively renegotiating the media session to use a second codec, wherein a capacity pre-defined for the second codec is less than or equal to the available capacity via the second wireless coverage area, and wherein the proactive renegotiation occurs before the WCD is handed off.

7. The method of claim 6, further comprising:
maintaining a neighbor set of wireless coverage areas, wherein transmitting the first request to the server occurs in response to a membership of the neighbor set changing.

8. The method of claim 6, wherein transmitting the first request to the server occurs in response to determining that the WCD will be handed off.

9. The method of claim 6, wherein transmitting the first request to the server occurs periodically.

10. The method of claim 6, wherein the WCD maintains a pre-handoff threshold value, and wherein determining that the WCD will be handed off from the first wireless coverage area to the second wireless coverage area comprises determining that a coverage quality value of the first wireless coverage area is less than the pre-handoff threshold value.

11. The method of claim 6, wherein the media session uses a Session Initiation Protocol (SIP) for signaling and wherein proactively renegotiating the media session to use the second codec involves the WCD transmitting a mid-session SIP INVITE message to the remote host.

12. The method of claim 6, wherein the plurality of wireless coverage areas includes a third wireless coverage area, the method further comprising:
determining that the WCD will be handed off from the second wireless coverage area to the third wireless coverage area;
transmitting a second request to the server, seeking to determine an available capacity via the third wireless coverage area;
receiving, from the server and in response to the second request, a second indication of the available capacity via the third wireless coverage area;
determining that the available capacity via the third wireless coverage area is more than the capacity pre-defined for the first codec; and
after the WCD is handed off to the third wireless coverage area, renegotiating the media session to use the first codec.

13. The method of claim 6, wherein the media session is of a type chosen from the group consisting of a voice session, a video session, and an audio session.

14. A method performed by a server, wherein the server is communicatively coupled to a radio access network (RAN), wherein the RAN comprises a plurality of wireless coverage areas, wherein the plurality of wireless coverage areas includes a first wireless coverage area and a second wireless coverage area, wherein a wireless communication device (WCD) is served by the first wireless coverage area, and wherein a base transceiver station (BTS) radiates to define the second wireless coverage area, the method comprising:
receiving, from the BTS, a sector loading of the second wireless coverage area;
receiving, from a router, an available backhaul capacity of a link between the RAN and a network, wherein the link is coupled to the router;
receiving, from the WCD, a request seeking to determine an available capacity via the second wireless coverage area, wherein the WCD is engaged in an ongoing media session and the WCD has established that the WCD may be handed off to the second wireless coverage area;
determining the available capacity via the second wireless coverage area based in part upon the sector loading of the second wireless coverage area and the available backhaul capacity of the link between the RAN and the network; and
transmitting, to the WCD, an indication of the determined available capacity, whereby the WCD can establish whether the determined available capacity is sufficient to support the ongoing media session.

15. The method of claim 14, wherein the available capacity via the second wireless coverage area is determined also based on a profile of the WCD.

16. The method of claim 15, wherein the profile of the WCD contains an indication of a priority of the WCD, and wherein the available capacity via the second wireless coverage area is determined also based on the priority of the WCD.

17. The method of claim 16, further comprising:
if the WCD's priority is at or above a threshold value, determining a first capacity, wherein available capacity via the second wireless coverage area is determined also based on the first capacity; and
if the WCD's priority is below the threshold value, determining a second capacity, wherein the first capacity is greater than the second capacity, and wherein available capacity via the second wireless coverage area is determined also based on the second capacity.

18. The method of claim 14, wherein the sector loading of the second wireless coverage area is determined by a number of data sessions at the second wireless coverage area.

19. The method of claim 14, wherein the sector loading of the second wireless coverage area is determined by an aggregate data rate at the second wireless coverage area.

20. The method of claim 14, wherein a plurality of WCDs are served by the second wireless coverage area, and wherein the sector loading of the second wireless coverage area is determined by measurements of coverage quality of the second wireless coverage area received from the plurality of WCDs.

* * * * *